(12) United States Patent
Dietz

(10) Patent No.: US 6,568,805 B1
(45) Date of Patent: May 27, 2003

(54) MAGNETIC BUCKLE FOR EYEGLASSES

(75) Inventor: Daniel Dietz, Houston, TX (US)

(73) Assignee: Dan L. Dietz Trust, Houston, TX (US)

( * ) Notice: Subject to any disclaimer, the term of this patent is extended or adjusted under 35 U.S.C. 154(b) by 0 days.

(21) Appl. No.: 10/003,775

(22) Filed: Nov. 26, 2001

(51) Int. Cl.$^7$ ................................................ G02C 5/14
(52) U.S. Cl. ........................................ 351/112; 24/3.3
(58) Field of Search ................................ 351/111, 140, 351/41, 112; 24/3.3

(56) References Cited

U.S. PATENT DOCUMENTS

| | | | |
|---|---|---|---|
| 1,898,059 A | 2/1933 | McDonald | |
| 1,973,648 A | 9/1934 | Nagel | |
| 3,582,192 A | 6/1971 | Gitlin | 351/52 |
| 4,050,785 A | 9/1977 | Auge | |
| 4,196,981 A | 4/1980 | Waldrop | 351/59 |
| 4,316,654 A | 2/1982 | Allen | |
| 4,496,224 A | 1/1985 | Allen | |
| 4,541,125 A | 9/1985 | Phillips | 2/10 |
| 4,662,729 A | 5/1987 | Dobson | 351/123 |
| 4,747,183 A | 5/1988 | Drlik | 16/228 |
| 4,771,515 A | 9/1988 | Guarro | 24/3 |
| 4,809,406 A | 3/1989 | Tsai | 24/3 |
| 4,903,375 A | 2/1990 | DiFranco | 24/3 |
| 4,946,125 A | 8/1990 | McCarty | 248/316 |
| 4,949,432 A | 8/1990 | Wisniewski | 24/3 |
| 5,005,263 A | 4/1991 | Barrett | 24/3 |
| 5,018,242 A | 5/1991 | Guy | 16/228 |
| 5,123,724 A | 6/1992 | Salk | 351/57 |
| 5,235,727 A | 8/1993 | McCloskey | 24/3 |
| 5,328,411 A | 7/1994 | Thornton | |
| 5,351,098 A | 9/1994 | McDaniels | |
| 5,355,184 A | 10/1994 | Varveris et al. | 351/106 |
| 5,372,345 A | 12/1994 | Schmidt | 248/231.8 |
| 5,408,279 A | 4/1995 | Chiou | 351/121 |
| 5,408,728 A | 4/1995 | Wisniewski | |
| 5,414,906 A | 5/1995 | Kren | 24/3.3 |
| 5,416,537 A | 5/1995 | Sadler | 351/57 |

(List continued on next page.)

FOREIGN PATENT DOCUMENTS

| | | |
|---|---|---|
| EP | 0385002 A1 | 5/1990 |
| JP | 53124455 | 10/1978 |
| JP | 54021357 | 2/1979 |
| JP | 9033865 | 2/1997 |
| JP | 09-252579 | 3/1999 |
| JP | 11064804 | 3/1999 |

OTHER PUBLICATIONS

Inventor believes JP 9033865 describes means of incorporating magnets in eyeglasses for medical treatment with magnetism.
JP 11064804: Computer translation attached.
Inventor believes JP53124455 describes magnets at end of templebars for medical treatment with magnetism.
Inventor believes JP54021357 describes magnets behind ears on templebars for medical treatment with magnetism.

Primary Examiner—Hung Xuan Dang
(74) Attorney, Agent, or Firm—Conley Rose, P.C.

(57) ABSTRACT

An eyeglasses clasp for maintaining eyeglasses on a clothing material. The clasp comprises magnetic means engaged with the eyeglasses temple bars and aligned with the eyeglasses frame body midpoint when the temple bars are closed. The magnets are in attractive magnetic communication when the temple bars into the closed position. The frame body and closed temple bars are then positioned on one side of a clothing material. The second temple bar is then pivoted into the close position such that it is on the other side of the clothing material. With the temple bars closed, the magnets are in attractive magnetic communication and impart a gripping force on the article of clothing. The gripping force substantially prevent movement between the temple bars and the clothing material.

69 Claims, 9 Drawing Sheets

U.S. PATENT DOCUMENTS

| | | |
|---|---|---|
| 5,491,878 A | 2/1996 | Janouschek ............... 24/3.3 |
| 5,568,207 A | 10/1996 | Chao ........................ 351/57 |
| 5,630,258 A | 5/1997 | Schneider ................. 24/303 |
| 5,682,222 A | 10/1997 | Chao |
| 5,719,655 A | 2/1998 | Peschel |
| 5,737,054 A | 4/1998 | Chao ........................ 351/47 |
| 5,877,838 A | 3/1999 | Chao ........................ 351/47 |
| 5,882,101 A | 3/1999 | Chao ........................ 351/47 |
| 5,883,688 A | 3/1999 | Chao ........................ 351/47 |
| 5,883,689 A | 3/1999 | Chao ........................ 351/47 |
| 5,929,964 A | 7/1999 | Chao ........................ 351/47 |
| 5,936,700 A | 8/1999 | Masunaga ................. 351/47 |
| 5,940,162 A | 8/1999 | Wong ........................ 351/47 |
| D417,462 S | 12/1999 | Chang ..................... D16/327 |
| 6,012,811 A | 1/2000 | Chao et al. ............... 351/47 |
| 6,017,120 A | 1/2000 | McCormick |
| 6,027,214 A | 2/2000 | Graham ..................... 351/57 |
| 6,045,221 A | 4/2000 | Resendez |
| 6,053,611 A | 4/2000 | Ku .............................. 351/47 |
| 6,092,896 A | 7/2000 | Chao et al. ............... 351/47 |
| 6,109,747 A | 8/2000 | Chao ........................ 351/47 |
| 6,116,732 A | 9/2000 | Xiao ........................ 351/47 |
| 6,132,040 A | 10/2000 | Xiao ........................ 351/47 |
| 6,139,141 A | 10/2000 | Zider ........................ 351/47 |
| 6,149,269 A | 11/2000 | Madison ................... 351/147 |
| 6,164,774 A | 12/2000 | Cate .......................... 351/47 |
| 6,168,273 B1 | 1/2001 | Dupraz |
| 6,170,948 B1 | 1/2001 | Chao ........................ 351/47 |
| 6,170,949 B1 | 1/2001 | Mauch ...................... 351/47 |
| 6,210,003 B1 | 4/2001 | Chan ........................ 351/112 |
| 6,217,170 B1 | 4/2001 | Hsiao ....................... 351/153 |
| 6,331,057 B1 | 12/2001 | Strube ...................... 351/47 |
| RE37,545 E | 2/2002 | Chao ........................ 351/57 |
| 6,343,858 B1 | 2/2002 | Zelman ..................... 351/47 |
| 6,367,126 B1 | 4/2002 | Rivkin ...................... 24/3.3 |
| 6,375,324 B2 | 4/2002 | Schleger et al. ......... 351/121 |
| 6,412,942 B1 | 7/2002 | McKenna et al. ......... 351/47 |
| 6,450,637 B1 | 9/2002 | Zelman ..................... 351/47 |

MAGNETIC BUCKLE FOR EYEGLASSES

BACKGROUND OF THE INVENTION

1. Field of the Invention

The present invention relates to improved eyeglasses. More particularly, it relates to an eyeglasses clasp for maintaining the eyeglasses in a pocket or on another portion of a clothing material when the eyeglasses are not in use.

2. Description of the Related Art

Typical eyeglasses consist of a frame body that houses two lenses on either side of a nose piece. Attached to the frame body are two temple bars that extend from two ends of the frame body. The temple bars pivot between an open position perpendicular with the frame body and a closed position parallel with the frame body. The temple bars and nose piece support the frame on the head of the wearer.

Individuals often remove their eyeglasses temporarily. They may put them down and not recall where, they may hang them around their neck where they bounce against their chest, or they may put them in a pocket and have them fall out an/or get damaged.

To solve this problem, the prior art teaches using mechanical clasps to clip eyeglasses to a garment worn by the user. These are cumbersome and, like all mechanical clasps, may come loose. Some mechanical clasps also depend on the availability of a shirt pocket, a cap visor, belt, holder, straps, or the like. In addition, clips may work well initially, but fatigue can cause metal clips to weaken and lose their ability to hold eyeglasses securely. Moreover, clips can break, thereby causing the eyeglasses to come loose, fall and break, or be lost. U.S. Pat. No. 6,017,120 to McCormick teaches a mechanical clip attached to the hinged end of the temple bars. Eyeglasses using such mechanical clips may not be securely held in place when inverted, such as when a person bends over at the waist. Another problem with such clips arises when a person in a sitting position bends forward, and the eyeglasses are pushed upward while clasped inside a shirt pocket. In that situation, the clip may be pushed up from the bottom of the pocket, thereby disengaging the clip and causing the eyeglasses to fall from the pocket.

The use of magnets on eyeglass frames for various purposes is also well known in the art. For example, a number of eyeglass frames have magnets that magnetize the wearer for health benefits. Other eyeglass frames use magnets to hold eyeglass frame sections together, thereby facilitating disassembly and reassembly in a new configuration, with auxiliary frames, lenses, or the like. U.S. Pat. No. 6,168,273 B11 to Dupraz et al. teaches the use of magnets on eyeglass frames to temporarily affix the eyeglasses on a support article having magnetic means. Because the magnets in Dupraz et al. are attached to the temple bar near the hinges, however, its teaching cannot be used as a magnetic clasp, nor was it intended as such.

SUMMARY OF THE EMBODIMENTS

One embodiment of the eyeglasses clasp comprises magnets engaged with the temple bars of eyeglasses. The magnets are located approximately the same distance away from the eyeglass frame body on each temple bar such that they align with the frame body midpoint when in the closed position. The magnets are in attractive magnetic communication at least when the temple bars are in the closed position. The magnets include a hollow space extending through the magnets that is large enough to slide the magnets onto the temple bars.

The clasp is typically used by pivoting one of the temple bars into the closed position. The frame body and closed temple bar are then positioned on one side of a clothing material, such as, by way non-limiting example only, a shirt pocket or sleeve. The second temple bar is then pivoted into the closed position such that it is on the other side of the clothing material. The magnets are then in attractive magnetic communication and impart a gripping force on the clothing material. The gripping force substantially prevents relative movement between the temple bars and the clothing material. The magnetic clasp thereby eliminates the disadvantages of a mechanical clip while introducing the advantage of a strong, versatile clasp that can be easily opened and closed anywhere the magnets are capable of being in strong enough attractive magnetic communication through the clothing material.

In another embodiment of the eyeglasses, magnets engage a specialized configuration of the temple bars themselves.

In another embodiment, the magnets on the temple bars each comprise two "half" magnets on either side of the temple bar. The magnets engage the temple bars by being in attractive magnetic communication with each other. The "half" magnets may also engage the temple bars with the use of an adhesive and be held in place by shrink-wrap tubing. The half magnets may also engage the temple bars by the use of a screw.

In another embodiment, one of the magnets is rectangular and is positioned on top of the temple bar. The location of one of the magnets on top of the temple bar reduces impact wear on the magnets when they are pivoted to the closed position.

The embodiments of the eyeglasses clasp may be in the form of complete eyeglasses, temple bars with magnetic means attached thereto, or a kit comprising a magnetic means and a means of attaching the magnetic means to temple bars, with or without temple bars or other eyeglass components.

Thus, the embodiments comprise a combination of features and advantages that enable them to overcome various problems of prior devices. The various characteristics described above, as well as other features, will be readily apparent to those skilled in the art upon reading the following detailed description of the embodiments, and by referring to the accompanying drawings.

BRIEF DESCRIPTION OF THE DRAWINGS

For a more detailed description of the embodiments, reference will now be made to the following accompanying drawings.

DETAILED DESCRIPTION OF THE EMBODIMENTS

The present invention relates to an eyeglasses clasp and is susceptible to embodiments of different forms. The drawings and the description below disclose in detail specific embodiments of the present invention with the understanding that this disclosure is to be considered an exemplification of the principles of the invention, and is not intended to limit the invention to that illustrated and described in the disclosure. Further, it is to be fully recognized that the different teachings of the embodiments discussed below may be employed separately or in any suitable combination to produce desired results.

The present invention combines the idea of using magnets on eyeglasses with the idea of using clips on eyeglasses for temporary storage of the eyeglass frames when the eyeglasses are not in use. The result is an extremely strong and versatile eyeglasses clasp that may be used to temporarily store eyeglasses anywhere the temple bars of the eyeglass frame may be closed on opposite sides of clothing or any other material through which the magnetic flux may operate. The clasp is not bulky, has no mechanical clip that may fail, and has no separate holder to attract the magnet. The eyeglasses frame may be placed either inside or outside the clothing material. In wet weather, the clasp may be engaged so that the eyeglasses frame is protected inside the clothing material, with only a temple bar exposed externally. The temple bar may also be placed inside the clothing material and magnetically clasped into place with the bulkier eyeglasses frame outside the pocket with the other temple bar.

Figure 1A:
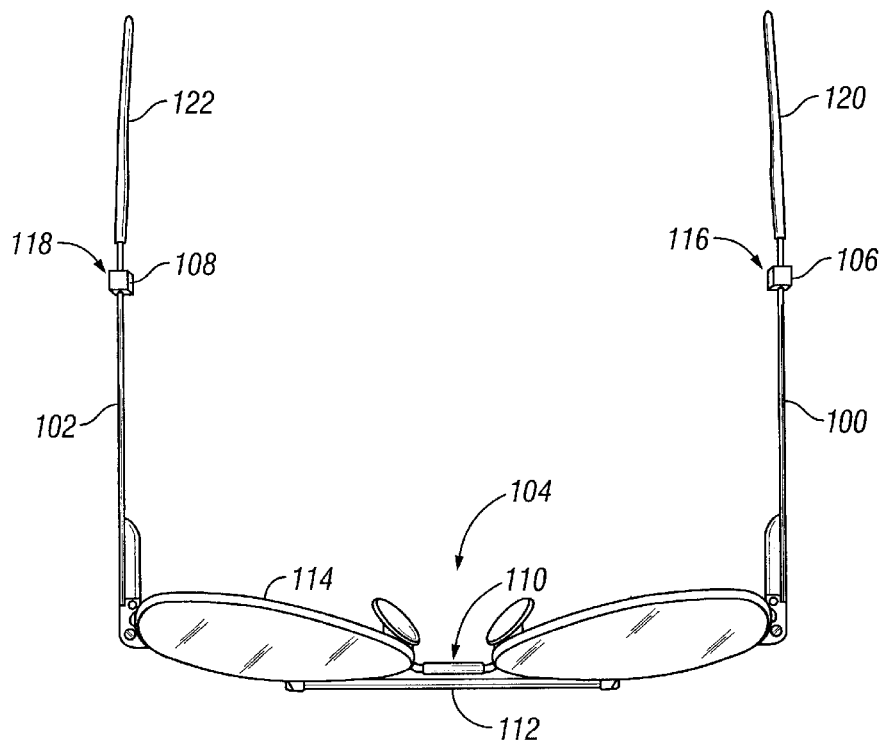
FIG. 1A is a bottom view of eyeglasses incorporating an eyeglass clasp with temple bars pivoted in the open position as when the eyeglasses are worn.
Figure 1B:
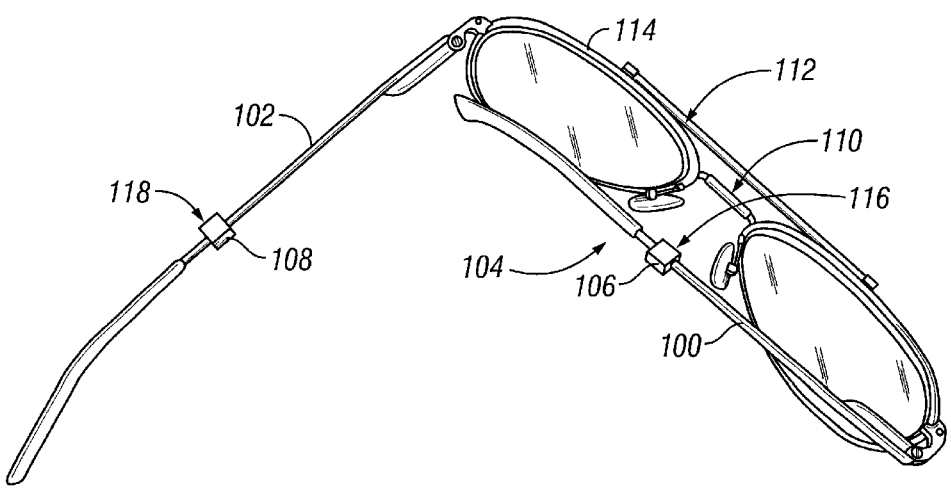
FIG. 1B is a perspective view of the eyeglasses incorporating an eyeglass clasp with one of the temple bars pivoted into the closed position.
Figure 1C:
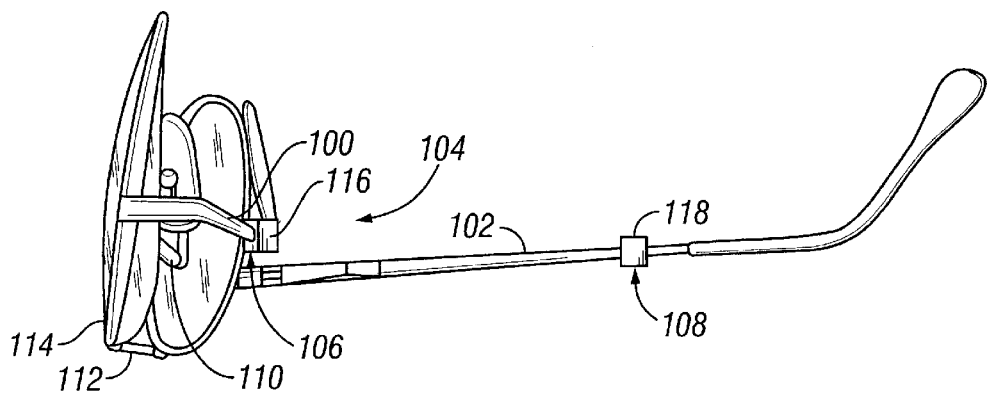
FIG. 1C is a side view of the eyeglasses incorporating an eyeglass clasp with one of the temple bars pivoted into the closed position.
Figure 1D:
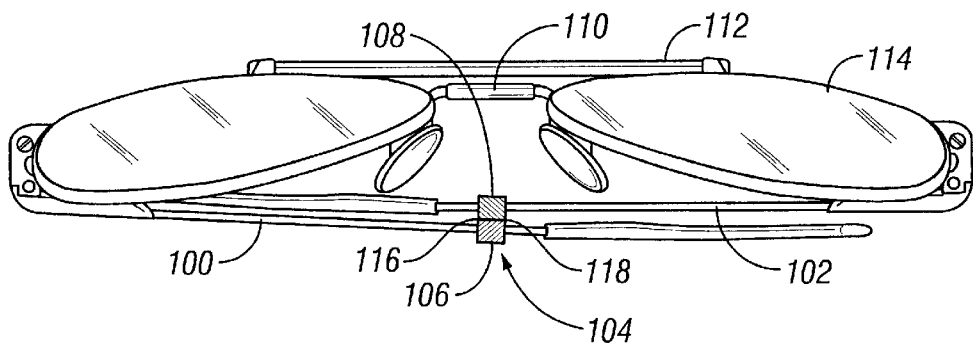
FIG. 1D is a bottom view of the eyeglasses incorporating an eyeglass clasp with the temple bars pivoted into the closed position.

Referring initially to FIGS. 1A–1D, there is shown an embodiment of the eyeglasses clasp 104. A right temple bar 100 and a left temple bar 102 are pivotally attached to an eyeglasses frame body 114 by any suitable means. Typically, the temple bars 102, 103 are pivotally attached by spring action hinges well known in the art. The temple bars 100, 102 pivot between an open position perpendicular to the eyeglasses frame body 114 and a closed position parallel to the frame body 114. When in the open position, the temple bars form a squared "U" shape as illustrated in FIG. 1A. In addition, the temple bar 100 includes an earpiece 120 and the temple bar 102 includes an earpiece 122. The frame body 114 also includes a nose piece 112 and has a midpoint 110. A first magnetic means 106 engages the temple bar 100 and a second magnetic means 108 engages the temple bar 102 such that the polarity of the magnetic means 106, 108 directed outside the "U" in FIG. 1A is the same. The magnetic means 106, 108 are equidistant on the temple bars 100, 102 such that they align with the eyeglasses frame body midpoint 110 when the temple bars 100, 102 are in the closed position. Thus, as illustrated in FIG. 1D, when temple bars 100, 102 are pivoted closed, the magnetic means 106, 108 are in attractive magnetic communication created by the opposite poles of the magnetic means 106, 108. FIG. 1D shows left temple bar 102 folded on the inside of right temple bar 100. The South pole side 116 of the magnetic means 106 thus faces and aligns with the North pole side 118 of the magnetic means 108, thereby holding the temple bars securely in the closed position.

The means for attaching the magnetic means 106, 108 to the temple bars 100, 102 may depend on the material from which the temple bars are made. It should be appreciated that any suitable method may be used for engaging the magnetic means with the temple bars. Such attachment means for various temple bar materials include, by way of non-limiting example, grooved means, adhesive means, shrink-wrap tubing, hinged clips, metal clamps, threaded hardware, and the like, and/or a combination thereof. As shown in FIGS. 1A–1D, the magnetic means 106, 108 have a hollow space extending through the magnetic means that is large enough to fit over the temple bars 100, 102. The hollow magnetic means are typically installed by removing the earpieces 120, 122, sliding the hollow magnetic means onto the temple bars 100, 102, and then replacing the earpieces 120, 122. In addition, the magnetic means 106, 108 may be protected from corrosion by a number of means, including by way of non-limiting example, coatings of zinc, nickel, copper, gold, different colored epoxy, aluminum chromate, and/or different types of paint.

The eyeglasses clasp 104 is not limited to a complete set of eyeglasses, but may also comprise temple bars with magnetic means attached thereto, or a kit comprising a magnetic means and a means of attaching the magnetic means to temple bars, with or without temple bars or other eyeglass components therein.

Figure 2A:
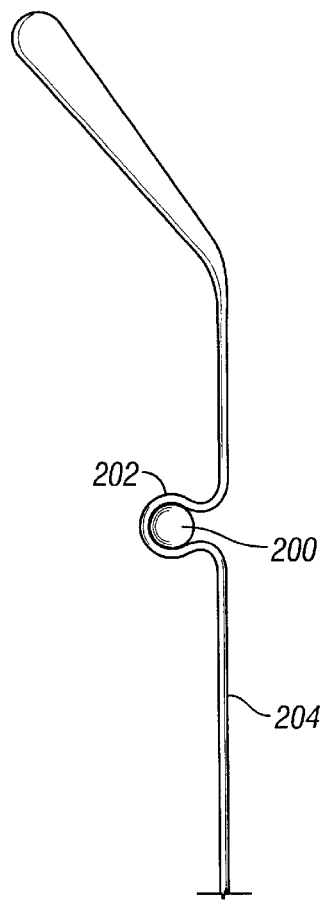
FIG. 2A is a side view of another embodiment of the eyeglasses clasp showing an eyeglasses temple bar with the magnet held in a semi-loop in the temple bar.
Figure 2B:
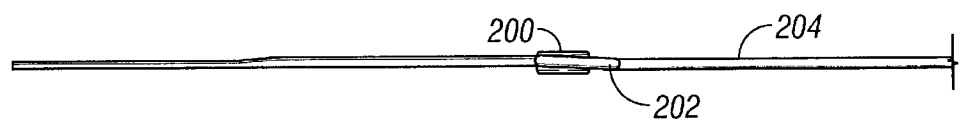
FIG. 2B is a bottom view of an eyeglasses temple bar incorporating the eyeglasses clasp of FIG. 2A with the magnet held in a semi-loop in the temple bar.
Figure 2C:
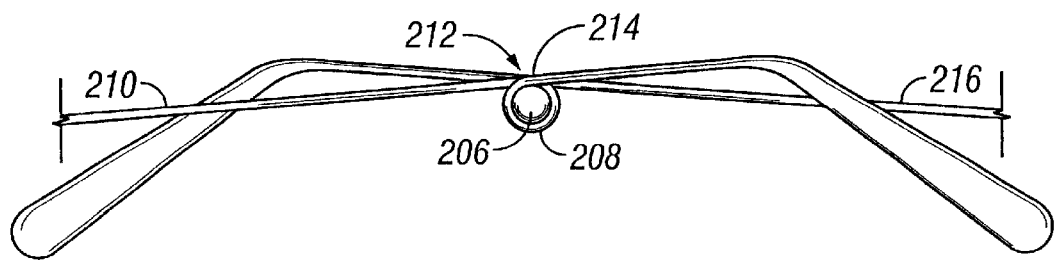
FIG. 2C is a rear view of eyeglasses temple bars pivoted in the closed position and incorporating the eyeglasses clasp of FIG. 2A with the magnet held in a loop in the temple bar.
Figure 2D:
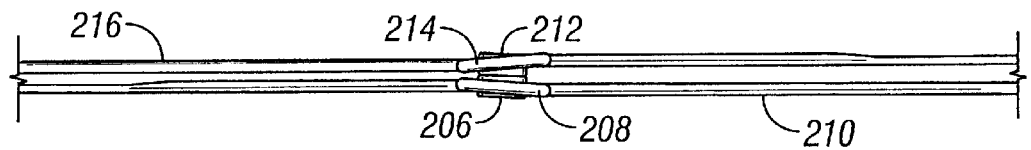
FIG. 2D is a bottom view of the eyeglasses temple bars pivoted in the closed position and incorporating the eyeglasses clasp of FIG. 2A with the magnet held in a loop in the temple bar.

Referring now to FIGS. 2A–2D, there is shown the temple bars 204, 210, and 216 of other embodiments of the eyeglasses clasp 104. FIGS. 2A and 2B show the magnetic means 200 engaged with the temple bar 204 by a semi-loop 202 in the temple bar 204. In FIGS. 2C and 2D, a first magnet 206 engages full loop 208 in the temple bar 210, and a second magnet 212 engages full loop 214 of the temple bar 216. The polarity of magnets 206, 212 are opposite when the magnets 206, 212 touch as shown in FIG. 2D. Thus, the magnets 206, 212 are attracted to each other by the magnetic attraction created by their opposite poles. The semi-loop 202 of the temple bar 204 and the full loop 208 of the temple bars 210, 216 are located such that they align with the midpoint 110 of nose piece 112 as shown in FIG. 1D. The size of the semi-loop 202 and the full loops 208, 214 may be selected to accommodate the diameter of magnets 200, 206, and 212 respectively, which may be held in place by adhesive means, or by other means well known in the art.

As illustrated in FIG. 2, the means for engaging the magnetic means may require modification of existing eyeglass frame temple bars to accommodate attachment of a magnet. Accordingly, when sold as a kit, the eyeglasses clasp 104 may comprise two magnets, modified temple bars, and a means of attaching the magnets to the temple bars.

Figure 3A:
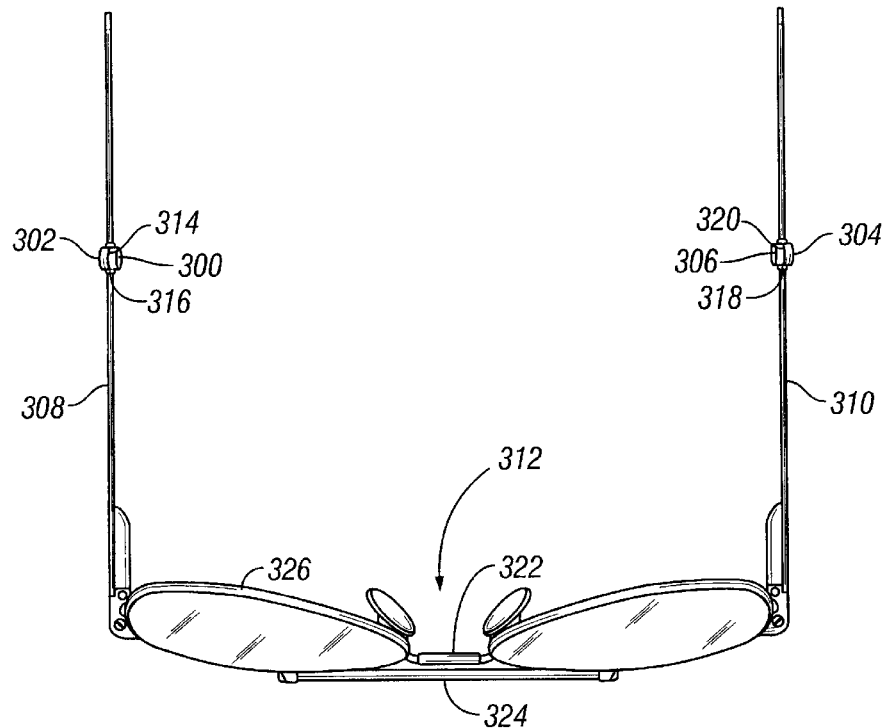
FIG. 3A is a side view of an eyeglasses temple bar incorporating an eyeglass clasp constructed in accordance with another embodiment of the eyeglasses clasp with the magnet in shrink-wrap tubing.
Figure 3B:
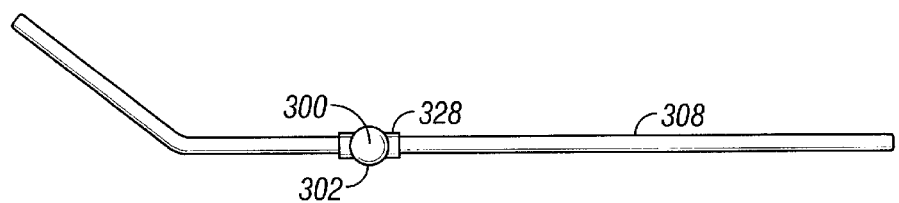
FIG. 3B is a bottom view of an eyeglasses temple bar incorporating the eyeglasses clasp of FIG. 3A with the magnet in shrink-wrap tubing.
Figure 3C:
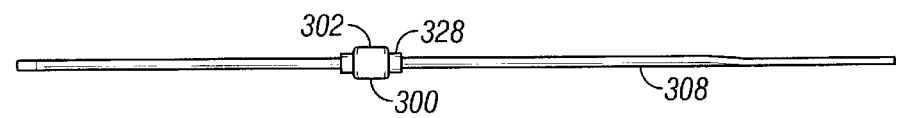
FIG. 3C is a top view of an eyeglasses temple bar incorporating the eyeglasses clasp of FIG. 3A with the magnet affixed to the temple bar with a small screw.
Figure 3D:
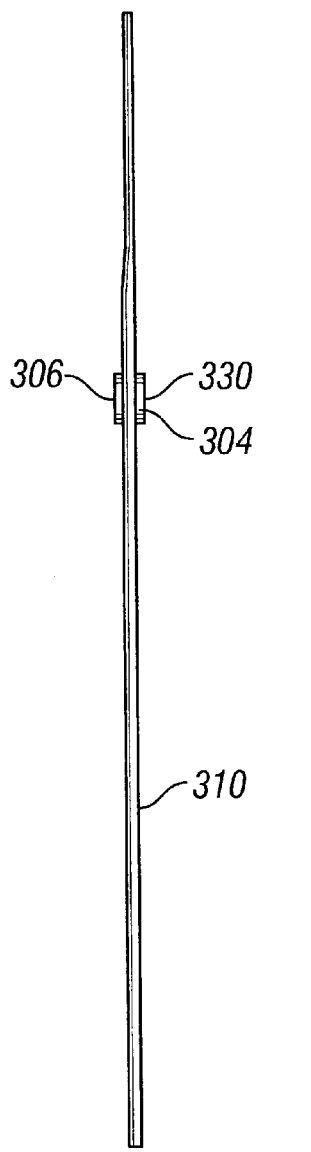
FIG. 3D is a side view of an eyeglasses temple bar incorporating the eyeglasses clasp of FIG. 3A with the magnet affixed to the temple bar with a small screw.
Figure 3E:
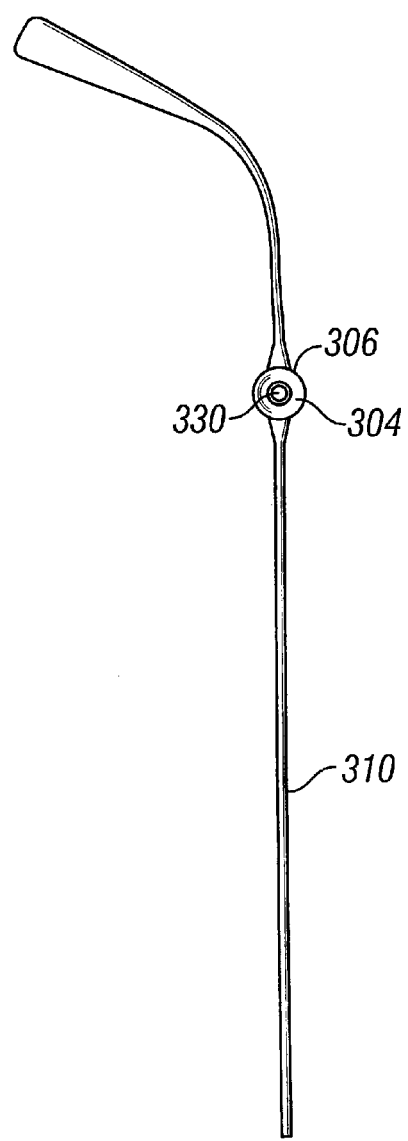

Referring now to FIGS. 3A–3E, there is shown another embodiment of the eyeglasses clasp 312. In FIG. 3A, a first magnet 300 and a second magnet 302 engage the temple bar 308 of the frame body 326. A third magnet 304 and a fourth magnet 306 engage the temple bar 310. Magnets 300, 302 engage the left temple bar 308 such that the North pole side 314 of the magnet 300 faces and aligns with the South pole side 316 of the magnet 302. Similarly, the magnets 304, 306 engage the right temple bar 310 such that the North pole side 318 of the magnet 306 faces and aligns with the South pole side 320 of the magnet 304. As in FIG. 1, magnets 300, 302, 304, and 306 are positioned equidistantly on the temple bars 308, 310 such that they align with the midpoint 322 of the nose piece 324 of the eyeglasses frame body 326. In FIGS. 3B and 3C, the magnets 300, 302 engage the temple bar 308 with shrink-wrap tubing 328. However, in FIGS. 3D and 3E, the magnets 304, 306 engage the temple bar 310 with a screw 330. As described above, it should be appreciated that various engagement means suitable for the material from which temple bars 308 and 310 is made may be used.

As illustrated in FIGS. 3A–3E, the temple bars 308, 310 do not have to be modified for there to be magnetic attraction between the magnetic means, regardless of which temple bar is closed first. Thus, this embodiment may comprise two temple bars with magnetic means, or, when sold as a kit, this embodiment may comprise four magnets and a means of attaching pairs of the magnets to existing temple bars.

Figure 4A:
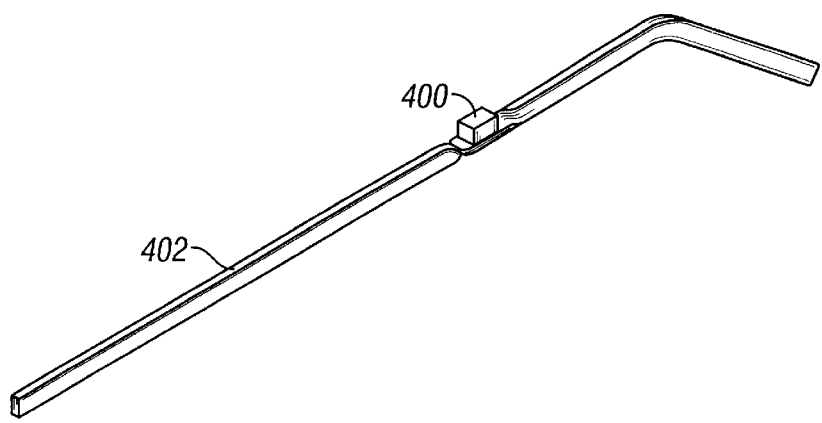
FIG. 4A is a perspective view of an eyeglasses temple bar incorporating another embodiment of an eyeglasses clasp with a rectangular magnet.
Figure 4B:
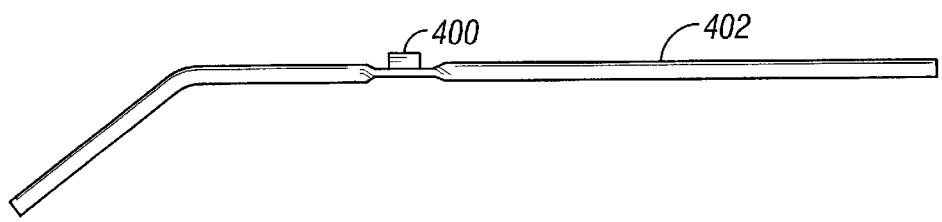
FIG. 4B is a side view of an eyeglasses temple bar incorporating the eyeglasses clasp of FIG. 4A with a rectangular magnet.
Figure 4C:
FIG. 4C is a top view of an eyeglass frame temple bar incorporating the eyeglasses clasp of FIG. 4A with a rectangular magnet.

Referring now to FIGS. 4A–4C, there is shown a temple bar 402 of another embodiment of the eyeglasses frame clasp 104. Clasp 104 comprises a rectangular magnet 400 attached to the temple bar 402 and magnetic means 106 on the temple bar 100 shown in FIG. 1. Magnet 400 aligns with the eyeglasses frame body midpoint 110 when the temple bar 402 is pivoted into the closed position. The polarity of the magnet 400 is such that the magnet 400 is attracted to the magnetic means 106 on the temple bar 100 in FIG. 1 when both temple bars 100, 402 are pivoted in the closed position. The magnet 400 is rectangular and located on the top of the temple bar 402 to protect the magnet 400 from coming into striking contact with magnetic means 106 when the temple bars, 100, 402 are pivoted into the closed position. By not coming into striking contact, the magnetic means 106 and the magnet 400 are not as susceptible to being damaged or disengaged from the temple bars 100, 402. It should be appreciated that the magnetic means 106 and magnet 400 may engage either temple bar and still be within the scope of the invention.

Figure 5:
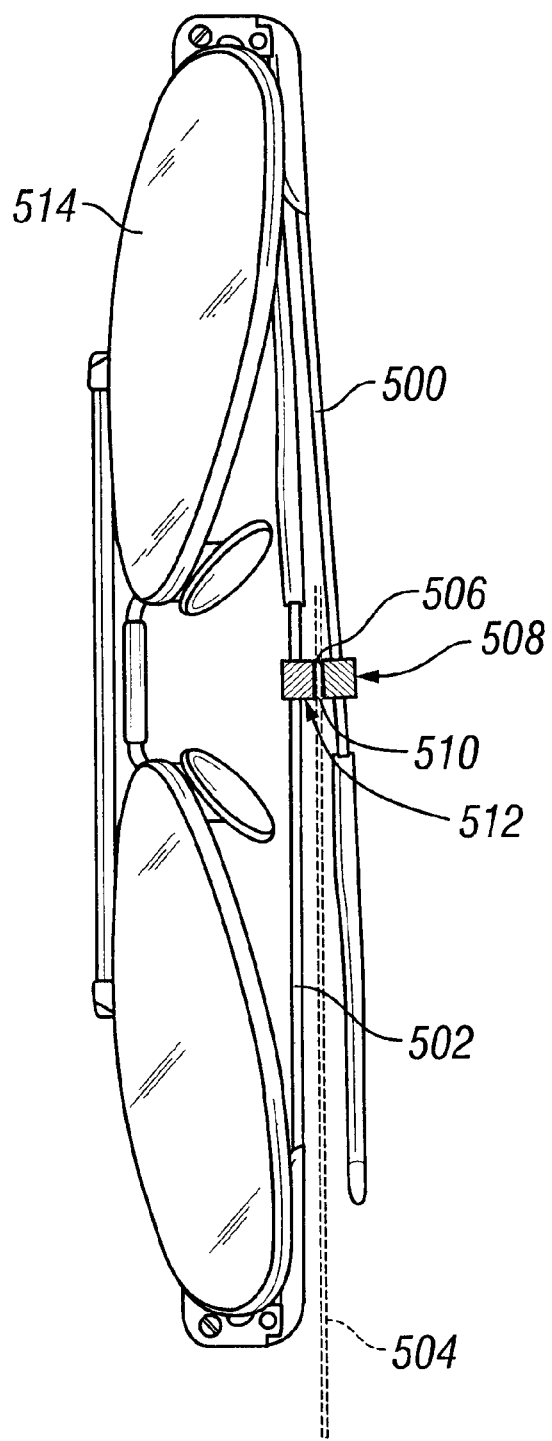
FIG. 5 is a bottom view of the eyeglasses incorporating the eyeglasses clasp with the temple bars pivoted in the closed position.

Referring now to FIG. 5, the left temple bar 500 and the right temple bar 502 of the eyeglasses clasp 104 are pivoted into the closed position. The left temple bar 500 is positioned outside a clothing material 504. The right temple bar 502 is positioned inside the clothing material 504. Thus, the clothing material 504 is located between the temple bars 500, 502. During use, the wearer pivots one of the temple bars 500, 502 into the closed position. The wearer then positions the eyeglasses frame body 114 and the closed temple bar on one side of the clothing material 504. The wearer then pivots the other temple bar into the closed position such that it is on the other side of the clothing material 504. The South pole side 506 of the magnetic means 508 faces and aligns with the North pole side 510 of magnetic means 512. Although on either side of the clothing material 504, the magnetic means 508, 512 are in attractive magnetic communication with each other. The attractive magnetic communication is strong enough to impart a gripping force on the clothing material 504, thereby holding the eyeglasses 514 securely clasped to clothing material 504. The gripping force substantially prevents relative movement between the temple bars 500, 502 and the clothing material 504 while the temple bars 500, 502 are in the closed position. The magnetic means 508, 512 are strong enough to keep the eyeglasses 514 in place even when the eyeglasses 514 are jarred. The magnetic means 508, 512 are also able to maintain this strength because the magnetic flux is not diminished by repeated use. It should be appreciated that either temple bar 500, 502 may be pivoted into the closed position before the other and still be within the scope of the invention.

Figure 6:
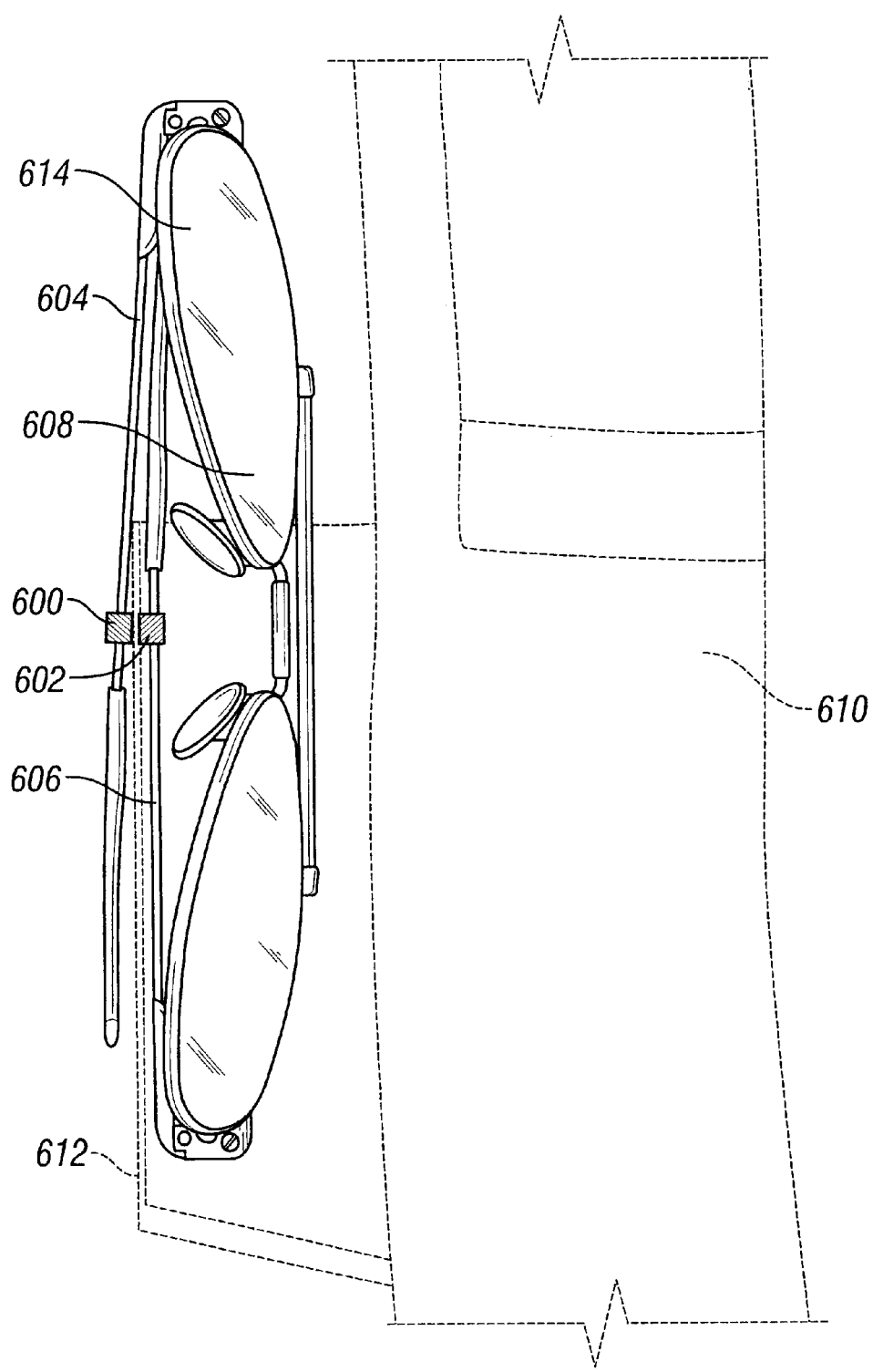
FIG. 6 is a bottom view of the eyeglasses incorporating the eyeglasses clasp with the temple bars pivoted in the closed position depicting use of the clasp with clothing material.

Referring now to FIG. 6, there is shown how the eyeglass frame clasp 104 clasps eyeglasses 608 to a clothing material 612 by magnetically clasping to any portion of the clothing material 612. In FIG. 6, opposite pole magnetic attracting forces emanate from the magnetic means 600, 602 attached to the temple bars 604, 606, respectively. Clasping is achieved by folding the temple bar 606 and sliding the temple bar 606 and the frame body 614 into a pocket, lapel, neck collar, or the like. The wearer then folds the temple bar 604 outside the garment 610, thereby placing the temple bars 604, 606 in attractive magnetic communication through the clothing material 612. Alternatively, clasping may be achieved by sliding either of the temple bars 604, 606 into a pocket, lapel, neck collar, or the like, and folding the frame body 614 and the other temple bar outside of the garment 610. In addition, clasping may be achieved by folding the temple bar 604 and sliding the temple bar 604 and the frame body 614 into the garment 610. The wearer then folds the temple bar 606 outside the garment 610. It should be appreciated that either temple bar 604, 606 may be pivoted into the closed position before the other and still be within the scope of the invention.

The present invention eliminates difficulties associated with using a support article by, in effect, using the eyeglasses themselves as a means for clasping onto any material through which the magnets may remain in attractive magnetic communication. For example, a separate support article incorporated in clothing would be cumbersome in washers and dryers, difficult to iron, and alter the appearance of the garment whereas the present invention has none of these disadvantages. In addition, unlike mechanical clips that attach to clothing described in the prior art, the present invention is not limited by the requirement that such clips attach to the edge of material. Instead, the clasp of the present invention attaches anywhere through material so that only a hinged edge of the frame body is at the edge of the material. Thus, for example, the present invention permits eyeglasses to be clasped more deeply in a pocket, whereas prior art clips require a greater portion of the eyeglasses to protrude outside the pocket. The clasp, once engaged at the center of the frame body, keeps the frame body from flopping end-over-end as could happen if the clasp were off-center. Moreover, the eyeglasses, held in a balanced mode, stay attached regardless of the position in which the clothing material edge is placed.

Example 1. The 4-magnet embodiment in FIGS. 3A–3E wherein the magnets 300, 302, 304, 306 are MGO grade 35 Neodymium (Nd—Fe—B) disks 0.25" diameter and 0.1" thick. The shrink-wrap tubing has an OD of 0.350" before shrinking, a wall thickness of 0.020", and is parallel to the temple bars 308, 310. The magnets 300, 302, 304, 306 exhibit a field of 4 kG and require a load of 400 gm for un-clasping.

Example 2. The 4-magnet embodiment in FIGS. 3A–3E wherein the magnets 300, 302, 304, 306 are MGO grade 35 Neodymium disks 0.25" diameter and 0.1" thick. The shrink-wrap tubing has an OD of 0.350" before shrinking, a wall thickness of 0.010", and is perpendicular to the temple bars 308, 310. The magnets exhibit a field of 6 kG and require a load of 600 gm for unclasping.

While specific embodiments have been shown and described, modifications can be made by one skilled in the art without departing from the spirit or teaching of this invention. The embodiments as described are exemplary only and are not limiting. Many variations and modifications of the system and apparatus are possible and are within the scope of the invention. Accordingly, the scope of protection is not limited to the embodiments described, but is only limited by the claims that follow, the scope of which shall include all equivalents of the subject matter of the claims.

I claim:

1. Eyeglasses comprising:
a frame body having a midpoint;
a first temple bar pivotally engaged to a first end of the frame body;
a second temple bar pivotally engaged to a second end of the frame body;
a first magnetic means engaged with the first temple bar at a distance from the frame body first end such that the first magnetic means aligns with the frame body midpoint when the first temple bar is pivoted closed;
a second magnetic means engaged with the second temple bar at a distance from the frame body second end such that the second magnetic means aligns with the frame body midpoint when the second temple bar is pivoted closed;
wherein the second magnetic means is in attractive magnetic communication with the first magnetic means at least when the temple bars are pivoted closed; and
wherein the first and second magnetic means remain in attractive magnetic communication when the temple bars are closed but separated by clothing material, the attractive magnetic communication imparting a gripping force on the clothing material sufficient enough to substantially prevent relative movement between the temple bars and the clothing material.

2. The eyeglasses in claim 1 wherein:
the first magnetic means comprises a first magnet; and
the second magnetic means comprises a second magnet.

3. The eyeglasses in claim 1 wherein:
the first magnetic means comprises a first half magnet engaged with a first side of the first temple bar and a second half magnet engaged with a second side of the first temple bar in attractive magnetic communication with the first half magnet; and
the second magnetic means comprises a third half magnet engaged with a first side of the second temple bar and a fourth half magnet engaged with a second side of the second temple bar in attractive magnetic communication with the third half magnet.

4. The eyeglasses in claim 3 wherein the magnets are MGO grade 35 Neodymium.

5. The eyeglasses in claim 1 wherein the magnetic means engage the temple bars with an adhesive and are held in place with shrink-wrap tubing.

6. The eyeglasses in claim 5 wherein the tubing has a 0.020" OD and has a 0.350" OD before shrinking.

7. The eyeglass frame in claim 1 wherein the magnetic means engage the temple bars with a screw.

8. The eyeglasses in claim 1 wherein the magnetic means engage the temple bars in circular frames.

9. The eyeglasses in claim 8 wherein the circular frames are loops.

10. The eyeglasses in claim 8 wherein the circular frames are semi-loops.

11. The eyeglasses in claim 1 wherein the magnetic means are covered with a coating to prevent rust.

12. The eyeglasses in claim 1 wherein the magnetic means include a hollow passage extending through the magnetic means for engaging the temple bars.

13. The eyeglasses in claim 1 wherein the magnetic means engage the temple bars with an adhesive.

14. The eyeglasses in claim 1 wherein the magnetic means engage the temple bars with shrink-wrap tubing.

15. Eyeglasses comprising:
a frame body having a midpoint;
a first temple bar pivotally engaged to a first end of the frame body;
a second temple bar pivotally engaged to a second end of the frame body;
a first magnet engaged with the first temple bar at a distance from the frame body first end such that the first magnet aligns with the frame body midpoint when the first temple bar is pivoted closed;
a second magnet engaged with the second temple bar at a distance from the frame body second end such that the second magnet aligns with the frame body midpoint when the second temple bar is pivoted closed;
wherein the second magnet is in attractive magnetic communication with the first magnet at least when the temple bars are pivoted closed; and
wherein the first and second magnets remain in attractive magnetic communication when the temple bars are closed but separated by clothing material, the attractive magnetic communication imparting a gripping force on the clothing material sufficient enough to substantially prevent relative movement between the temple bars and the clothing material.

16. The eyeglasses in claim 15 wherein:
the first magnet comprises a first half magnet engaged on a first side of the first temple bar and a second half magnet engaged on a second side of the first temple bar, the first and second half magnets being in attractive magnetic communication; and
the second magnet comprises a third half magnet engaged on a first side of the second temple bar and a fourth half magnet engaged on a second side of the second temple bar, the third and fourth half magnets being in attractive magnetic communication.

17. The eyeglasses in claim 16 wherein the magnets are MGO grade 35 Neodymium.

18. The eyeglasses in claim 15 wherein the magnets engage the temple bars with an adhesive and held in place with shrink-wrap tubing.

19. The eyeglasses in claim 18 wherein the tubing has a 0.020" OD and has a 0.350" OD before shrinking.

20. The eyeglasses in claim 15 wherein the magnets each include a hollow passage extending through the magnets for engaging the temple bars.

21. The eyeglasses in claim 15 wherein the magnets engage the temple bars with an adhesive.

22. The eyeglasses in claim 15 wherein the magnets engage the temple bars with shrink-wrap tubing.

23. The eyeglasses in claim 15 wherein the magnets engage the temple bars with a screw.

24. The eyeglasses in claim 15 wherein the magnets engage the temple bars in circular frames.

25. The eyeglasses in claim 24 wherein the circular frames are loops.

26. The eyeglasses in claim 24 wherein the circular frames are semi-loops.

27. The eyeglasses in claim 15 wherein the magnets are covered with a coating to prevent rust.

28. A clasp for eyeglasses, the eyeglasses having a frame body with first and second ends and a midpoint, a first temple bar, and a second temple bar, the temple bars being pivotally engaged with the frame body at the frame ends, the clasp comprising:
    a first magnet engageable with the first temple bar at a distance from the frame body first end such that the first magnet aligns with the frame body midpoint when the first temple bar is pivoted closed;
    a second magnet engageable with the second temple bar at a distance from the optical frame body second end such that the second magnet aligns with the frame body midpoint when the second temple bar is pivoted closed;
    wherein the second magnet is in attractive magnetic communication with the first magnet at least when the temple bars are pivoted closed; and
    wherein the first and second magnets remain in attractive magnetic communication when the temple bars are closed but separated by clothing material, the attractive magnetic communication imparting a gripping force on the clothing material sufficient enough to substantially prevent relative movement between the temple bars and the clothing material.

29. The clasp in claim 28 wherein:
    the first magnet comprises a first half magnet engageable on a first side of the first temple bar and a second half magnet engageable on a second side of the first temple bar, the first and second half magnets being in attractive magnetic communication; and
    the second magnet comprises a third half magnet engageable on a first side of the second temple bar and a fourth half magnet engageable on a second side of the second temple bar, the third and fourth half magnets being in attractive magnetic communication.

30. The clasp in claim 29 wherein the magnets are MGO grade 35 Neodymium.

31. The clasp in claim 28 wherein the magnets engage the temple bars with an adhesive and held in place with shrink-wrap tubing.

32. The clasp in claim 31 wherein the tubing has a 0.020" OD and has a 0.350" OD before shrinking.

33. The clasp in claim 28 wherein the magnets each include a hollow passage extending through the magnets for engaging the temple bars.

34. The clasp in claim 28 wherein the magnets engage the temple bars with an adhesive.

35. The clasp in claim 28 wherein the magnets engage the temple bars with shrink-wrap tubing.

36. The clasp in claim 28 wherein the magnets engage the temple bars with a screw.

37. The clasp in claim 28 wherein the magnets engage the temple bars in circular frames.

38. The clasp in claim 37 wherein the circular frames are loops.

39. The clasp in claim 37 wherein the circular frames are semi-loops.

40. The clasp in claim 28 wherein the magnets are covered with a coating to prevent rust.

41. A method of engaging eyeglasses to a clothing material comprising:
    providing the eyeglasses, the eyeglasses comprising:
        a frame body having a midpoint;
        a first temple bar pivotally engaged to a first end of the frame body;
        a second temple bar pivotally engaged to a second end of the frame body;
        a first magnet engaged with the first temple bar at a distance from the frame body first end such that the first magnet aligns with the frame body midpoint when the first temple bar is pivoted closed; and
        a second magnet engaged with the second temple bar at a distance from the frame body second end such that the second magnet aligns with the frame body midpoint when the second temple bar is pivoted closed;
    pivoting the first temple bar to the closed position;
    positioning the frame body and first temple bar on one side of the clothing material;
    pivoting the second temple bar to the closed position such that the second temple bar is on the other side of the clothing material than the frame body and first temple bar; and
    imparting a gripping force on the clothing material from the first and second magnets being in attractive magnetic communication through the clothing material.

42. A method of engaging eyeglasses to a clothing material comprising:
    providing the eyeglasses, the eyeglasses comprising:
        a frame body having a midpoint;
        a first temple bar pivotally engaged to a first end of the frame body;
        a second temple bar pivotally engaged to a second end of the frame body;
        a first attractive means engaged with the first temple bar at a distance from the frame body first end such that the first attractive means aligns with the frame body midpoint when the first temple bar is pivoted closed; and
        a second attractive means engaged with the second temple bar at a distance from the frame body second end such that the second attractive means aligns with the frame body midpoint when the second temple bar is pivoted closed;
    pivoting the first temple bar to the closed position;
    positioning the frame body and first temple bar on one side of the clothing material;
    pivoting the second temple bar to the closed position such that the second temple bar is on the other side of the clothing material than the frame body and first temple bar; and
    imparting a gripping force on the clothing material from the first and second attractive means attracting each other through the clothing material.

43. The method of claim 42 wherein the first and second attractive means are magnets.

44. A clasp for eyeglasses, the eyeglasses having a frame body with first and second ends and a midpoint, a first temple bar, and a second temple bar, the first and second temple bars being pivotally engaged with the frame body at the frame ends by first and second spring action hinges, respectively, the clasp comprising:

a first magnet engaged with the first temple bar at a distance from the frame body first end such that the first magnet aligns with the frame body midpoint when the first temple bar is pivoted closed;

a second magnet engaged with the second temple bar at a distance from the frame body second end such that the second magnet aligns with the frame body midpoint when the second temple bar is pivoted closed;

wherein the second magnet is in attractive magnetic communication with the first magnet at least when the temple bars are pivoted closed; and wherein the first and second magnets remain in attractive magnetic communication when the temple bars are closed but separated by clothing material, the attractive magnetic communication imparting a gripping force on the clothing material sufficient enough to substantially prevent relative movement between the temple bars and the clothing material.

45. The clasp in claim 44 wherein:

the first magnet comprises a first half magnet engaged on a first side of the first temple bar and a second half magnet engaged on a second side of the first temple bar, the first and second half magnets being in attractive magnetic communication; and the second magnet comprises a third half magnet engaged on a first side of the second temple bar and a fourth half magnet engaged on a second side of the second temple bar, the third and fourth half magnets being in attractive magnetic communication.

46. The clasp in claim 45 wherein the magnets are MGO grade 35 Neodymium.

47. The clasp in claim 44 wherein the magnets engage the temple bars with an adhesive and held in place with shrink-wrap tubing.

48. The clasp in claim 47 wherein the tubing has a 0.020" OD and has a 0.350" OD before shrinking.

49. The clasp in claim 44 wherein the magnets include a hollow passage extending through the magnetic means for engaging the temple bars.

50. The clasp in claim 44 wherein the magnets engage the temple bars with an adhesive.

51. The clasp in claim 44 wherein the magnets engage the temple bars with shrink-wrap tubing.

52. The clasp in claim 44 wherein the magnets engage the temple bars with a screw.

53. The clasp in claim 44 wherein the magnets engage the temple bars in circular frames.

54. The clasp in claim 53 wherein the circular frames are loops.

55. The clasp in claim 53 wherein the circular frames are semi-loops.

56. The clasp in claim 44 wherein the magnets are covered with a coating to prevent rust.

57. A clasp for eyeglasses, the eyeglasses having a frame body having first and second ends and a midpoint, the clasp comprising:

a first temple bar for engagement to the first end of the frame body;

a second temple bar for engagement to the second end of the frame body;

a first magnet engaged with the first temple bar at a distance from the frame body first end such that the first magnet aligns with the frame body midpoint when the first temple bar is pivoted closed;

a second magnet engaged with the second temple bar at a distance from the frame body second end such that the second magnet aligns with the frame body midpoint when the second temple bar is pivoted closed;

wherein the second magnet is in attractive magnetic communication with the first magnet at least when the temple bars are pivoted closed; and wherein the first and second magnets remain in attractive magnetic communication when the temple bars are closed but separated by clothing material, the attractive magnetic communication imparting a gripping force on the clothing material sufficient enough to substantially prevent relative movement between the temple bars and the clothing material.

58. The clasp in claim 57 wherein:

the first magnet comprises a first half magnet engaged on a first side of the first temple bar and a second half magnet engaged on a second side of the first temple bar, the first and second half magnets being in attractive magnetic communication; and the second magnet comprises a third half magnet engaged on a first side of the second temple bar and a fourth half magnet engaged on a second side of the second temple bar, the third and fourth half magnets being in attractive magnetic communication.

59. The clasp in claim 58 wherein the magnets are MGO grade 35 Neodymium.

60. The clasp in claim 57 wherein the magnets engage the temple bars with an adhesive and held in place with shrink-wrap tubing.

61. The clasp in claim 60 wherein the tubing has a 0.020" OD and has a 0.350" OD before shrinking.

62. The clasp in claim 57 wherein the magnets include a hollow passage extending through the magnetic means for engaging the temple bars.

63. The clasp in claim 57 wherein the magnets engage the temple bars with an adhesive.

64. The clasp in claim 57 wherein the magnets engage the temple bars with shrink-wrap tubing.

65. The clasp in claim 57 wherein the magnets engage the temple bars with a screw.

66. The clasp in claim 57 wherein the magnets engage the temple bars in circular frames.

67. The clasp in claim 66 wherein the circular frames are loops.

68. The clasp in claim 66 wherein the circular frames are semi-loops.

69. The clasp in claim 57 wherein the magnets are covered with a coating to prevent rust.

* * * * *

UNITED STATES PATENT AND TRADEMARK OFFICE
CERTIFICATE OF CORRECTION

PATENT NO. : 6,568,805 B1
DATED : May 27, 2003
INVENTOR(S) : Dan L. Dietz

It is certified that error appears in the above-identified patent and that said Letters Patent is hereby corrected as shown below:

<u>Title page,</u>
Item [75], Inventor, should read

-- [75] Inventor: Dan L. Dietz, Houston, TX (US) --

Signed and Sealed this

Twenty-fifth Day of May, 2004

JON W. DUDAS
*Acting Director of the United States Patent and Trademark Office*